(12) United States Patent
Prucher

(10) Patent No.: US 8,157,656 B2
(45) Date of Patent: Apr. 17, 2012

(54) BEARING ASSEMBLY

(76) Inventor: Bryan Prucher, Clarkston, MI (US)

( * ) Notice: Subject to any disclaimer, the term of this patent is extended or adjusted under 35 U.S.C. 154(b) by 373 days.

(21) Appl. No.: 12/319,267

(22) Filed: Jan. 5, 2009

(65) Prior Publication Data

US 2009/0186708 A1    Jul. 23, 2009

Related U.S. Application Data

(60) Provisional application No. 61/010,045, filed on Jan. 4, 2008.

(51) Int. Cl.
*F16D 3/40* (2006.01)
(52) U.S. Cl. .................... 464/132; 384/279; 384/902
(58) Field of Classification Search ................ 464/8, 9, 464/127–130, 132; 384/279, 902
See application file for complete search history.

(56) References Cited

U.S. PATENT DOCUMENTS

| 1,571,595 | A | * | 2/1926 | Lovejoy | 464/132 |
|---|---|---|---|---|---|
| 1,587,046 | A | * | 6/1926 | Spicer | 464/9 |
| 2,893,793 | A | * | 7/1959 | Ryshavy | 384/279 |
| 2,964,363 | A | * | 12/1960 | Daykin et al. | 384/279 |
| 3,087,314 | A | * | 4/1963 | Jarvis et al. | 464/132 |
| 3,267,696 | A | * | 8/1966 | Sieja | 464/132 |
| 3,635,535 | A | * | 1/1972 | Schultenkamper | 464/132 |
| 2002/0082092 | A1 | * | 6/2002 | Beitzel et al. | 464/132 |

* cited by examiner

*Primary Examiner* — Gregory Binda
*Assistant Examiner* — Josh Skroupa
(74) *Attorney, Agent, or Firm* — The Weintraub Group, P.L.C.

(57) ABSTRACT

The present invention provides a bearing cup assembly for a universal joint comprising a cylindrically elongated bearing cup, the bearing cup having a cylindrical sidewall, a closed bottom wall, and an open top. The bearing cup is positioned over, and rotates freely on, a cylindrically elongated trunnion which is associated with the universal joint. The bearing cup assembly further comprises a lubricant-impregnated powder metal mass disposed within the bearing cup and positioned between the sidewall and closed bottom wall of the bearing cup and the trunnion. The assembly further comprises a circular seal having an open center and being disposed about the open top of the bearing cup. The trunnion is disposed within the open center of the circular seal and the seal is in close interfitment with the open top and the trunnion so as to form an impenetrable closure therebetween.

11 Claims, 5 Drawing Sheets

BEARING ASSEMBLY

CROSS REFERENCE TO RELATED APPLICATION

This application claims the benefit of U.S. Provisional Application 61/010,045, which was filed on Jan. 4, 2008, the disclosure of which is hereby incorporated by reference.

BACKGROUND OF THE INVENTION

1. Field of the Invention

The present invention pertains to universal joints for use in drive train, power steering, and power transmission systems. More particularly, the present invention pertains to a bearing cup for a universal joint. Even more particularly, the present invention pertains to a lubricant impregnated bearing cup for a universal joint.

2. Description of the Prior Art

Universal joints are well known devices for transferring rotational movement between two members adapted to rotate about non-aligned axes of rotation. They are widely used to connect rotatable members in vehicular drive train and steering systems.

A typical drive train system for a rear-wheel drive vehicle comprises an output shaft extending from the transmission to a driveshaft. The output shaft is connected to a first end of the driveshaft via a first universal joint. A second universal joint connects a second end of the driveshaft to the vehicle's rear axle assembly. The two universal joints accommodate a limited amount of misalignment between the drive train components.

In steering systems, universal joints are used to connect the steering column to the pinion in a rack-and-pinion steering system.

Generally, the structure of a universal joint includes a cross assembly having a central body portion from which a plurality of trunnions outwardly extend. The trunnions are coplanar and are positioned at substantially equal angles relative to each other. Universal joints typically comprise three or four trunnions positioned about the body portion.

A hollow cylindrical bearing cup having a closed end and an open end is mounted on the end of each of the trunnions. A first opposed pair of bearing cups is connected about their cylindrical circumference to a first yoke which is coupled with the output shaft. The bearing cups mounted on the second opposed pair of trunnions are secured about their cylindrical circumference to a second yoke which is connected to the driveshaft.

As the drive train or steering system is operated, the driveshaft or steering column, respectively, is rotated. As rotation occurs about the output shaft, the universal joint is rotated, thus transferring the rotational energy to the drive shaft connected to the universal joint. As the output and drive shafts rotate, the bearing cups and trunnions may experience an angular displacement, or rotational movement, relative to each other as well. Although the output and drive shafts may experience a high rate of rotational speed, the rotation between the bearing cups and the trunnions may be minimal. The rotational motion between the bearing cup and the trunnion is angular and oscillatory, completing one full cycle per shaft revolution. Therefore, the rate of angular rotation between the bearing cups and the trunnions is sinusoidal and a function of the rate of the output shaft and the drive shaft rotation and the angle of misalignment between the output shaft and the drive shaft.

When a universal joint is transmitting a torsional load, the trunnion exerts a compression force upon the interior of the bearing cup. The compression force is a function of the torque transmitted about the universal joint.

Oftentimes, mechanical bearings, such as needle bearings, are positioned between an inner surface of the bearing cup and an outer surface of the trunnion to facilitate rotational movement between the trunnions and the bearing cups. The needle bearings require lubrication to ensure that they do not wear down unevenly and at an accelerated rate. In lieu of needle bearings, roller or ball elements may be used for mechanical bearing purposes.

However some bearing cups do not require mechanical bearings, as is described in U.S. Pat. No. 4,758,202 to Maciag et al. Nonetheless, all bearing cups require lubrication to reduce friction caused by the relative motion between the inner bearing cup surface and the outer trunnion surface.

When the universal joint is under a torsional load, each trunnion exerts a varying cyclical compressive force upon the interior of its respective bearing cup. The location of this force is along the contact surface between the bearing cup and the trunnion. The force varies in an oscillatory fashion as the bearing cup and the trunnion experience angular displacement relative to each other.

A conventional bearing cup which lacks sufficient lubrication can lead to premature system failure. To alleviate this, bearing cups often have a seal disposed at the open end of the cup to ensure that lubricant does not leak out of the bearing cup and around the trunnion. The seal also serves to prevent moisture, dirt, and other foreign matter from entering the bearing cup and contaminating the working surfaces, which can cause premature failure, as well.

During use, the lubricant comes under pressure, and it will often seep from the bearing cup. The bearing cup seal initially resists the lubricant from exiting the bearing cup. However universal joint seals are subjected to extreme environmental conditions in which aging is accelerated and cracks develop, leading to increased leakage of lubricant.

In the case of an impregnated powder metal bearing cup, as is described in U.S. Pat. No. 4,758,202 to Maciag et al., the cyclical compressive forces that occur as the bearing rotates, under load, back and forth on the trunnion, create a pumping action that causes the impregnated lubricant to dry out at the trunnion-bearing interface and weep from all of the exposed bearing surfaces. Consequently this causes failure of the internal components of the bearing cup, and eventually complete failure of the universal joint.

In addition to problems resulting from insufficient lubricant, universal joints are also subject to vibration-related issues. Systems that employ universal joints are comprised of a number of moving parts. Variations in manufacturing tolerance control can lead to shock, vibration, and noise which are transmitted throughout the entire system. This can cause an unacceptable annoyance to the vehicle operator and passengers, and can result in the ultimate failure of the universal joints.

The present invention, as is detailed herein below, seeks to solve these issues by providing an improved bearing cup which minimizes lubricant leakage. In addition, the present invention significantly reduces the transmission of shock, vibration, and noise from a first drive shaft to a second drive shaft.

SUMMARY OF THE INVENTION

In a first embodiment hereof, the present invention provides a bearing cup assembly for a universal joint. The assembly comprises a cylindrically elongated bearing cup, the bearing cup having a cylindrical sidewall, a closed bottom wall, and an open top. The walls and open top define an open interior cavity. The bearing cup is disposed about a cylindrically elongated trunnion which is associated with the universal joint, such that the trunnion is disposed within the open interior cavity of the bearing cup and rotates freely thereon.

The bearing cup assembly further comprises a powder metal mass disposed within the bearing cup and positioned between the sidewall and closed bottom wall of the bearing cup and the trunnion. The sidewall and closed bottom wall are composed of a different, non-porous material (such as steel, aluminum, plastic, etc.) which serves to close the outer surfaces of the powder metal mass and retain the lubricant within. This eliminates the cyclical load lubricant starvation condition at the working surfaces of the bearing. The powder metal mass is porous and is impregnated with a lubricant or suitable polymeric material which facilitates free rotation of the bearing cup relative to the trunnion.

The assembly further comprises a circular seal having an open center and being disposed about the open top of the bearing cup. The trunnion extends through the open center of the circular seal and the seal is in close interfitment with the open top and the trunnion so as to form an impenetrable closure therebetween.

In a second embodiment, the present invention further comprises a damper which lines the interior of the bearing cup along the side wall. The damper is formed from an elastomeric material.

In a third embodiment, the present invention further comprises a thrust cushion which is disposed within the interior cavity of the bearing cup and is positioned over the bottom wall.

In a fourth embodiment hereof, the present invention provides a universal joint for connecting a drive shaft and a driven shaft. The universal joint comprises a cross assembly, the cross assembly further comprising a central body portion and a plurality of trunnions. The plurality of trunnions is positioned about the central body portion and extends outwardly therefrom.

The universal joint further comprises a plurality of bearing cups, each of the bearing cups receiving a respective trunnion. Each of the bearing cups has a cylindrical side wall, a bottom wall, and an open top.

The universal joint further comprises a first yoke which connects a first pair of opposed bearing cups to a drive shaft. A second yoke connects a second pair of opposed bearing cups to a driven shaft.

The universal joint further comprises a damper which is disposed in each of the bearing cups and is positioned adjacent the interior wall of the cylindrical side wall. Optionally, the damper can be positioned to also cover the bottom wall as well.

The universal joint further, also includes, a powder metal mass disposed in each of the bearing cups and being positioned between the damper, the bottom wall of the bearing cup, and the trunnion. Each powder metal mass is impregnated with the lubricant.

The universal joint further comprises a seal positioned over the open top of each of the bearing cups. Each seal is generally circular in shape and has a generally circular-shaped central opening. The central opening is fitted for close interfitment with the trunnion such that the seal provides an impenetrable closure between the trunnion and the bearing cup to secure the powder metal mass therewithin.

For a more complete understanding of the present invention, reference is made to the following detailed description and accompanying drawing. In the drawing, like reference characters refer to like parts throughout the views in which:

DETAILED DESCRIPTION OF THE PREFERRED EMBODIMENT

Figure 1:
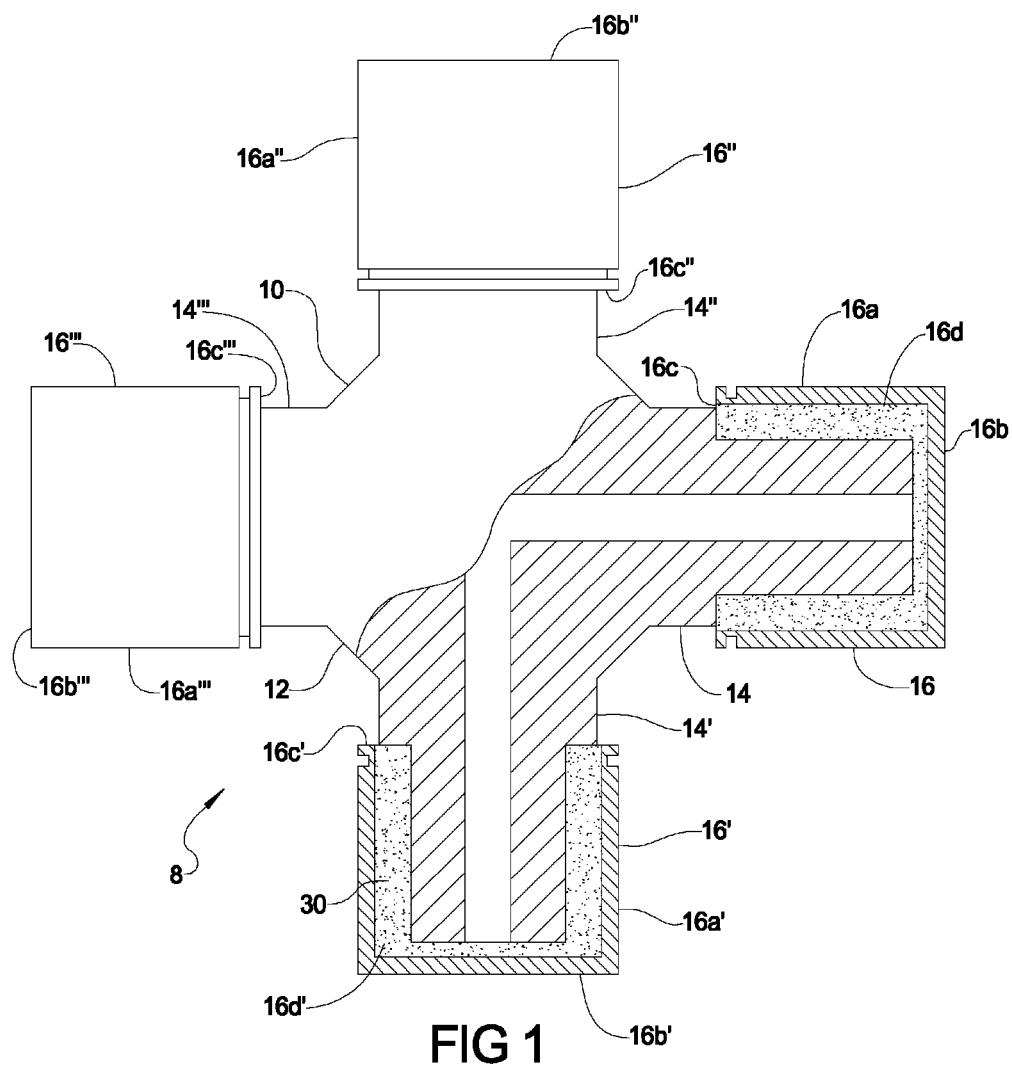
FIG. 1 is a side elevational view, partially in cross-section, of a first embodiment of a cross assembly for a universal joint in accordance with this invention.
Figure 2:
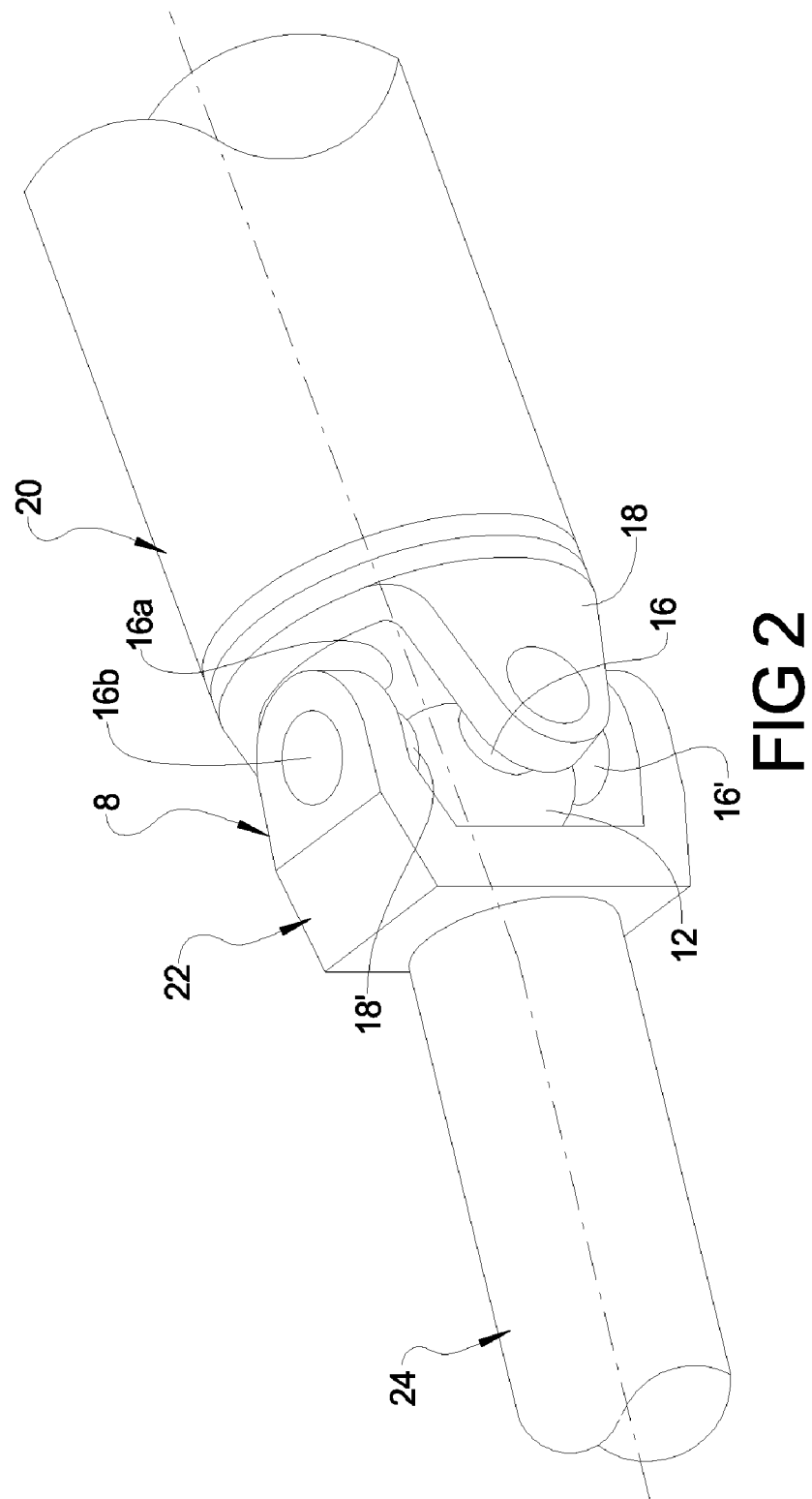
FIG. 2 is a perspective view of a universal joint connecting a first and second shaft.
Figure 3:
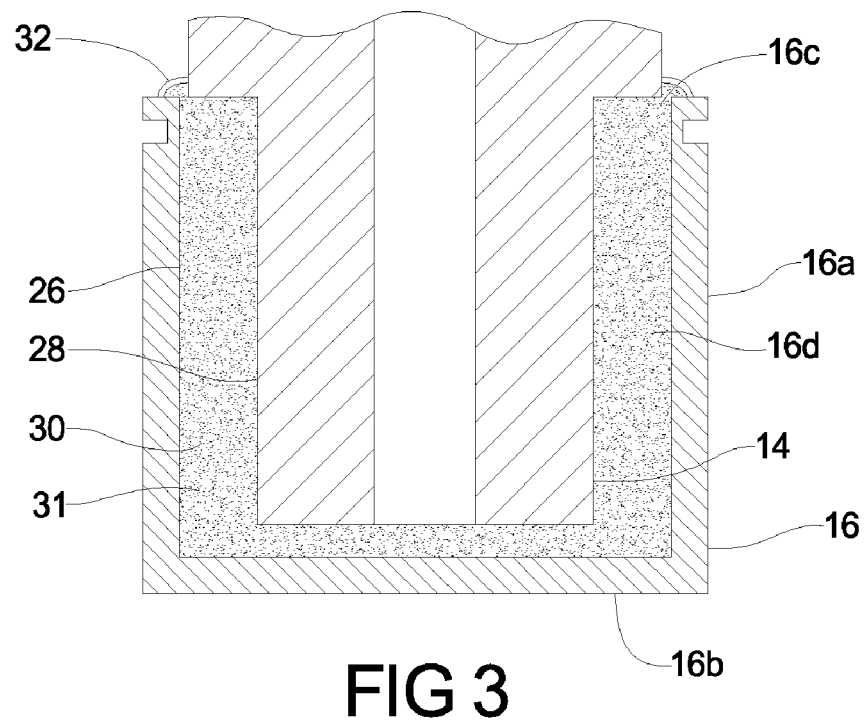
FIG. 3 is an enlarged cross-sectional side view of a trunnion and bearing cup assembly having a powder metal mass.

Referring now to the drawings, and in particular to FIGS. 1-3, in accordance with a first embodiment of the present invention, there is provided a universal joint 8 which generally comprises a cross assembly 10 which includes a central body portion 12. The central body portion 12 provides the basis of structural integrity to the universal joint 8. The joint 8 is, generally, formed of metal composition, such as iron, steel or aluminum, and can be cast, forged, or machined.

A plurality of trunnions 14,14',14",14'" extend outwardly from the central body portion 12. The trunnions are disposed in a single plane, and they are generally positioned about the body portion 12 at substantially equal angles from each other thereabout.

Each of the trunnions 14,14',14",14'" is generally cylindrical and integrally formed with the body portion 12. Each trunnion 14,14',14",14'" may have a concentric void which extends axially within it. The concentric void is provided to reduce the overall mass of the body portion 12.

As shown, a bearing cup 16,16',16",16'" is positioned or journaled onto the free end of each of the trunnions 14,14', 14",14'", respectively.

Each of the bearing cups 16,16',16",16'" is a substantially cylindrical member having a cylindrical sidewall 16a,16a', 16a",16a'", bottom wall 16b,16b',16b",16b'", and an open top 16c,16c',16c",16c'" with an open interior cavity 16d,16d', 16d",16d'".

As shown in FIG. 2, a first pair of opposed bearing cups 16,16" is connected to a first yoke 18 which, in turn, is connected to a first shaft 20. A second pair of opposed bearing cups 16',16'" is connected to a second yoke 22, which is connected to a second shaft 24. Each of the bearing cups 16,16',16",16'" are generally retained within their respective yoke 18,22 about the cylindrical sidewall 16a,16a',16a", 16a'", leaving the bottom wall 16b,16b',16b",16b'" exposed to the ambient.

As the first shaft 20 is rotated by means such as a motor or an engine, the rotational energy is transferred from the first shaft 20 to the second shaft 24 via the universal joint 8. The universal joint 8 allows the first shaft 20 and the second shaft 24 to be disposed along non-aligned axes.

As the shafts 20,24 rotate, the bearing cups 16,16',16",16'" and their respective trunnions 14,14',14",14'" experience rotational movement relative to each other. The actual amount of relative rotation between each coupled pair of bearing cups and trunnions is dependent upon both the rate of rotation of the shafts and the angle of misalignment between the shafts. However, in most applications, the relative rotation between a trunnion and its corresponding bearing cup is comparatively minimal with respect to the rotation of the drive shafts. Nonetheless, the forces transmitted through the bearing cups and trunnions can be very large, and means for reducing friction between the bearing cups and the trunnions must be provided.

For purposes of illustration and clarity, the ensuing description will be made with reference solely to bearing cup 16. Referring to FIG. 3, means for reducing friction is disposed between an inner bearing cup surface 26 and an outer trunnion surface 28 of the bearing cup 16. A powder metal mass 30 is disposed between the outer trunnion surface 28 and the inner bearing cup surface 26, and is compacted thereon to ensure contact between the surfaces 26,28.

The powder metal mass 30 is impregnated with a lubricant 31 which performs as a bearing between the trunnion 14 and the bearing cup 16. The inherent porosity of the powder metal provides a reservoir for the lubricant 31.

Types of powder metal which may be used include, but are not limited to, steel, nickel-steel, nickel-chrome, or various other types of ferrous or non-ferrous powder metals, as well as mixtures thereof.

Types of lubricant that may be used to impregnate the powder metal mass 30 include typical lubricating agents, such as grease or oil. In addition, some dry lubricants such as finely powdered molybdenum disulfide may be used. Combinations of these lubricants may be used as well. Impregnating these pores with certain classes of solid polymers, such as fluorocarbons, urethanes, and so forth, is also an acceptable option.

Impregnating the powder metal mass 30 with the lubricant 31 is achieved by employing any well known method in which the pores of the metal are vacuum-impregnated with the lubricant 31.

A seal 32 is secured around the open top 16c of the bearing cup 16 to form an impenetrable closure between the trunnion 14 and the bearing cup 16. Seals of this type are well known in the art, as described in U.S. Pat. No. 4,337,628 to Greene, the disclosure of which is hereby incorporated by reference.

Figure 4:
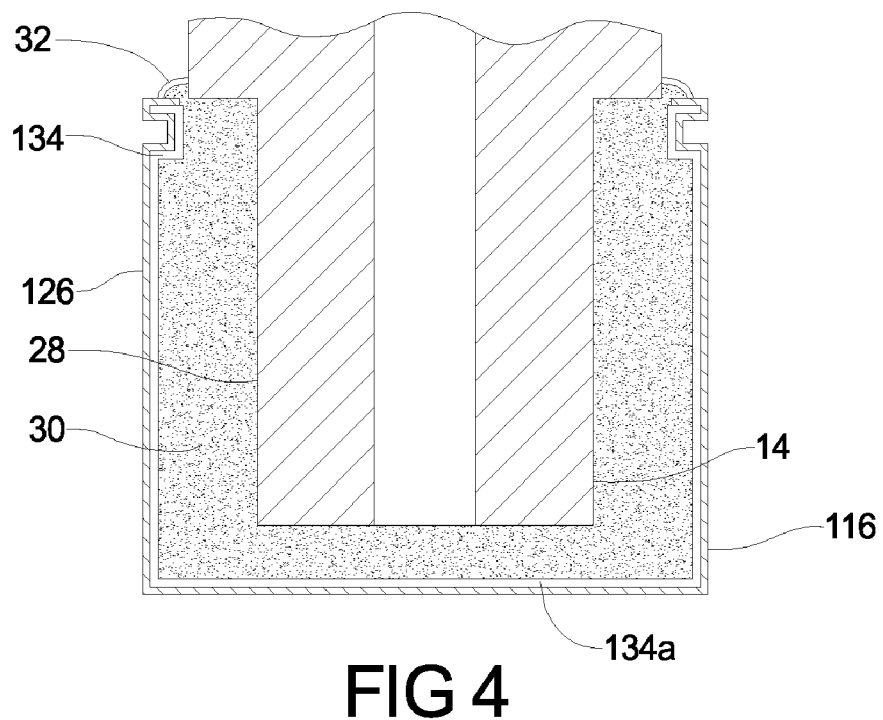
FIG. 4 is an enlarged cross-sectional side view of a trunnion and bearing cup assembly having a powder metal mass and a dampener.

In a further embodiment hereof, and as shown in FIG. 4, there is provided a bearing cup 116 having an inner bearing cup surface 126 which is lined with a damper 134. The damper 134 performs as a shock absorber between the driving and driven shafts (not shown), and it aids in alleviating vibration-related problems. The damper 134 may be either integrally molded into the bearing cup 116 or it may be manually inserted into the bearing cup 116 during assembly. A damper 134a may optionally be placed between bottom of the bearing cup 116 and the powder metal mass 30. The damper 134 may be formed of any type of suitable elastomeric material, such as a rubber or a polyurethane. In all other respects the bearing cup is as described above with reference to the first embodiment.

Figure 5:
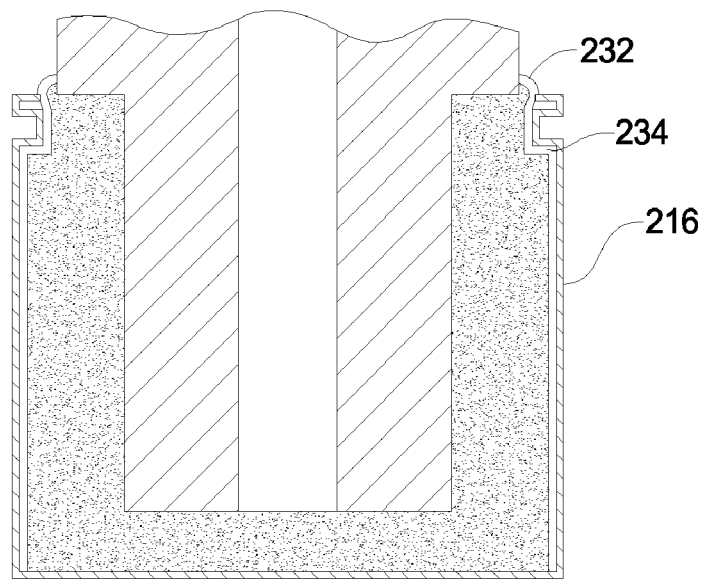
FIG. 5 is an enlarged cross-sectional side view of a trunnion and bearing cup assembly having a powder metal mass and a dampener which is integrally formed with a seal.

In a third embodiment hereof, and as shown in FIG. 5, there is provided a bearing cup 216 having a damper 234 as in the second embodiment. Here, the damper 234 is integrally formed with a seal 232, thereby allowing for a single-piece construction which both dampens vibration and seals lubricated powder metal within the bearing cup.

Figure 6:
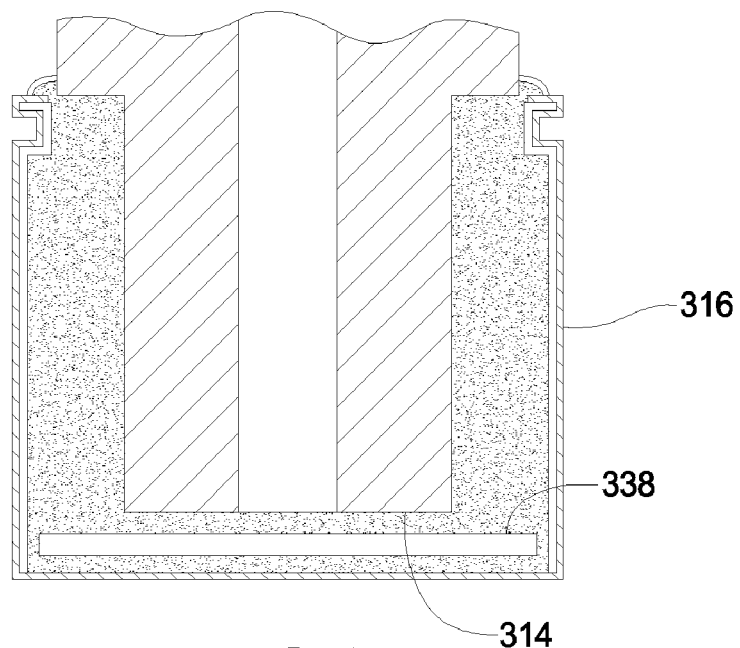
FIG. 6 is an enlarged cross-sectional side view of a trunnion and bearing cup assembly having a powder metal mass, a dampener, and a thrust cushion.

In a fourth embodiment hereof, and as shown in FIG. 6, there is provided a bearing cup 316 which includes a thrust cushion 338 disposed at the base, or bottom, of the bearing cup 316. Thrust cushions are well known in the art, and are typically provided to reduce the amount of friction between the end of the trunnion 314 and the bottom wall of the bearing cup 316 during use. Thrust cushions also assist in assembling a universal joint by properly gauging the installation depth of the bearing cup 316 onto the trunnion 314. In addition, the thrust cushion 338 enables the bearing cup 316 to fit tightly on the trunnion 314 to prevent the bearing cup 316 from moving axially relative to the trunnion 314 during operation, thereby reducing the amount of undesirable noise and vibration. The thrust cushion 338 can be formed from any number of various polymers, such as nylon, polyurethane elastomer, polyethylene, or the like. In addition, the thrust cushion 338 may either be integrally molded within the bearing cup 316 or it may be manually inserted into the bearing cup 316 during assembly. If the thrust cushion 338 is inserted during assembly, it may be compression fitted within the bearing cup 316.

It should be noted that the present invention can be used with or without the damper 134 (either with or without an integrally formed seal 232), and with or without the thrust cushion 338.

The present invention provides a universal joint assembly which costs less to manufacture, is easier to assemble, is less sensitive to manufacturing tolerance variations, and is less prone to failure due to system shock and vibration and solves the current lubricant starvation condition at the working surfaces. Using the present invention provides a cost-effective alternative to traditional bearing cups. There is also less risk of universal joint failure due to improper installation of mechanical bearings, or installation of faulty mechanical bearings.

Figure 7:
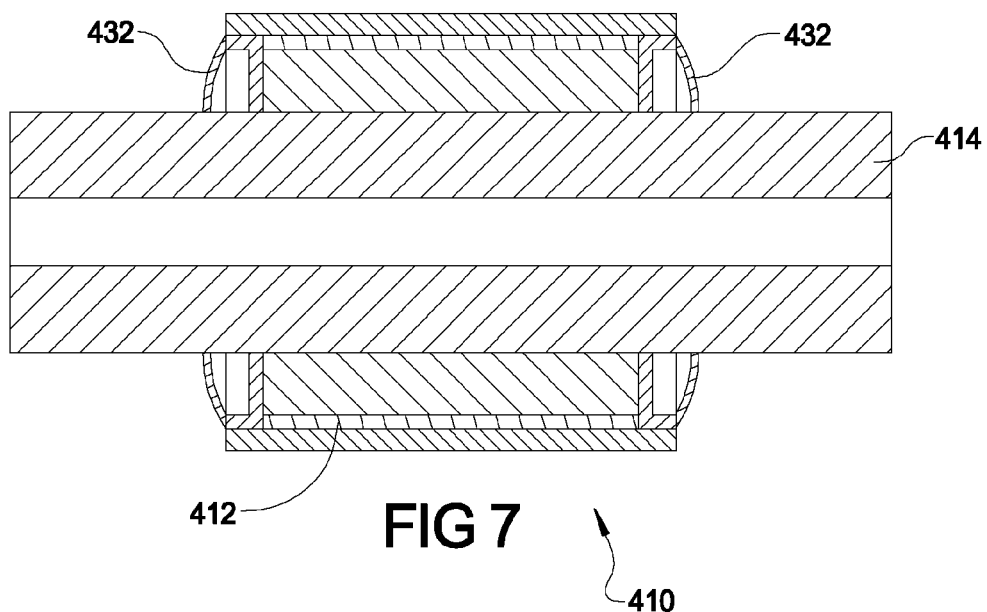
FIG. 7 is a cross-sectional view of a regular bearing having a dampening assembly system associated therewith.

It is also appreciated that the dampening aspect or use of a damper described herein may be used with a standard bearing 410, as shown in FIG. 7. In accordance herewith the bearing includes means for dampening 412. The means for dampening 412 is disposed between a bearing housing (not shown) and a bearing retainer 414, such as a shaft or other member which surrounds the bearing housing. The means for dampening performs as described above and is formed of any suitable elastomeric material such as a rubber, a polyurethane, or the like.

The deployment of a dampening material is equally applicable to a bushing as well. In use with a bushing, the dampening material would be interposed a bushing housing and a bushing retainer. Thus, according hereto a conventional bearing or bushing assembly is provided with means for dampening to minimize shock and vibratory motion. A conventional bearing or bushing employing this feature provides rotational freedom, misalignment compensation and vibratory isolation in one package that can be used as a substitute for any conventional bearing or bushing application.

As is apparent from the preceding, the present invention provides a lubricant-impregnated bearing cup for a universal joint which may have a damper and/or a thrust cushion. When used, the damper may be integrally formed with a seal. The present invention serves to minimize shock and vibration to the universal joint and shafts, as well as provide a lubricated powder metal mass and a seal which effectively retain the lubricant within the bearing cup.

What is claimed is:

1. A bearing cup assembly for a universal joint, the assembly comprising:
    a cylindrically elongated bearing cup, the bearing cup having a cylindrical side wall, a closed bottom wall, and an open top, the walls and open top defining an open interior cavity, the bearing cup being disposed about a cylindrically elongated trunnion associated with the universal joint such that the trunnion is disposed within the open interior cavity of the bearing cup and rotates freely thereon;

a powder metal mass disposed within the bearing cup and being positioned between the sidewall and closed bottom wall of the bearing cup and the trunnion, the powder metal mass having a plurality of pores being impregnated with a lubricant, the lubricant being disposed within the pores, the bearing cup being without the presence of a discrete lubricant well of predetermined configuration disposed within the mass, the lubricated powder metal mass facilitating free rotation of the bearing cup relative to the trunnion; and a circular seal having an open center and being disposed about the open top of the bearing cup, the trunnion extending through the open center of the circular seal, the seal further being in close interfitment with the open top and the trunnion so as to form an impenetrable closure therebetween.

2. The bearing cup assembly of claim 1 further comprising:
a damper, the damper being disposed within the interior cavity of the bearing cup and lining the sidewall, the damper being an elastomeric damper.

3. The bearing cup assembly of claim 2 wherein the damper is disposed within the interior cavity of the bearing cup and lining the closed bottom wall of the bearing cup.

4. The bearing cup assembly of claim 2 wherein the damper is integrally formed with the seal.

5. The bearing cup assembly of claim 2 wherein the damper is formed by being molded in the bearing cup.

6. The bearing cup assembly of claim 2 further comprising:
a thrust cushion, the thrust cushion being disposed within the interior cavity of the bearing cup and being positioned over the closed bottom wall.

7. The bearing cup assembly of claim 1 further comprising:
a thrust cushion, the thrust cushion being disposed within the interior cavity of the bearing cup and being positioned over the closed bottom wall.

8. The bearing cup assembly of claim 7 wherein the thrust cushion is formed by being molded in the bearing cup.

9. A bearing cup assembly for use in a universal joint, the universal joint having a cross assembly comprising a central body portion and a plurality of outwardly extending trunnions, each of the trunnions having an outermost end, the bearing cup assembly comprising;

a plurality of bearing cups, each of the plurality of bearing cups being disposed over a respective outermost end of each of the plurality of trunnions, each of the bearing cups having a cylindrical sidewall, a closed-end bottom wall, and an open top, each respective pair of the bearing cups and trunnions further being sized and positioned such that a gap extends between the bottom wall and sidewall of the bearing cups and the trunnion;

a cylindrically elongated elastomeric damper disposed within the interior cavity of each of the bearing cups and positioned adjacent to and about the sidewall of each of the bearing cups;

a powder metal mass disposed in each gap between each of the respectively coupled bearing cups and trunnions, the powder metal mass in each gap having a plurality of pores being impregnated with a lubricant, the lubricant being disposed within the pores, the bearing cup being without the presence of a discrete lubricant well of predetermined configuration disposed within the mass so as to facilitate free rotation of each of the bearing cups about the respective trunnion; and a circular seal disposed over the open top of each of the bearing cups, each of the seals having a central circular opening sized for close interfitment about and around the trunnion that is coupled with the respective bearing cup, the seal being integrally formed with the damper and forming an impenetrable closure to contain the powder metal mass within the respective bearing cup.

10. The bearing cup assembly of claim 9 further comprising:
a thrust cushion, the thrust cushion being disposed within the interior cavity of the bearing cup and being positioned over the closed bottom wall.

11. The bearing cup assembly of claim 9 wherein the damper is further positioned adjacent to the bottom wall of each of the bearing cups.

* * * * *